July 2, 1963 A. SEARS 3,096,454
CENTRIFUGAL DIRECT CURRENT ELECTRIC GENERATOR
Filed April 12, 1960 3 Sheets-Sheet 1
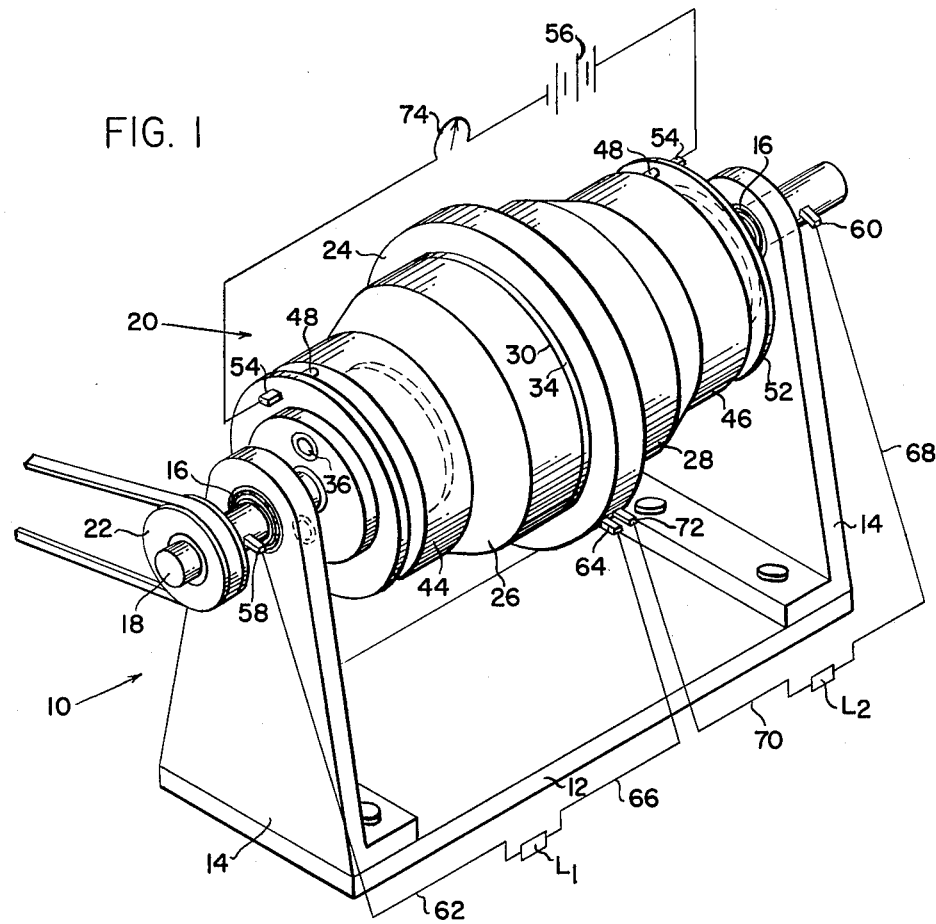
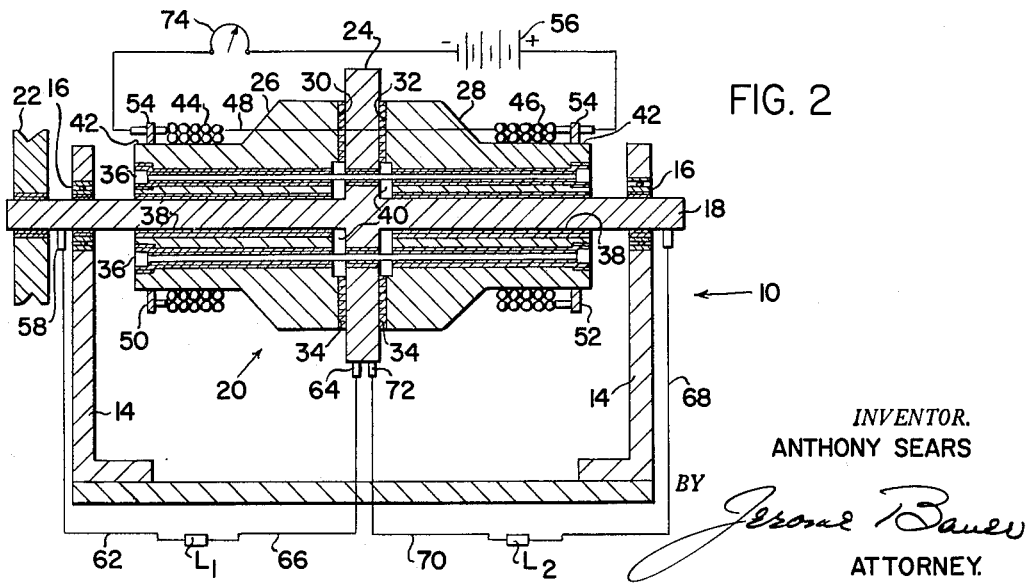
INVENTOR.
ANTHONY SEARS
BY
ATTORNEY.

INVENTOR.
ANTHONY SEARS

July 2, 1963  A. SEARS  3,096,454
CENTRIFUGAL DIRECT CURRENT ELECTRIC GENERATOR
Filed April 12, 1960  3 Sheets-Sheet 3

*INVENTOR.*
ANTHONY SEARS
BY *Jerome Bauer*
ATTORNEY.

United States Patent Office 3,096,454
Patented July 2, 1963

3,096,454
CENTRIFUGAL DIRECT CURRENT ELECTRIC
GENERATOR
Anthony Sears, 1061 Saint Nicholas Ave.,
New York, N.Y.
Filed Apr. 12, 1960, Ser. No. 21,759
14 Claims. (Cl. 310—178)

This invention relates to electric current generators and more particularly to generators for transmitting direct current.

Generators of the homopolar and coil-wound types are well known in the art of generating electromotive forces. Although it has been generally accepted in the past that coil-wound generators are superior to the homopolar or unipolar type and, therefore, more universally utilized, it is the desideratum of this invention to provide generators that operate substantially on the principle of the homopolar or unipolar type, but with the superior amperage output features of the coil-wound type.

The theory of homopolar machines is that it is immaterial whether the magnetic poles pieces, having its north-south poles, remains stationary as a conductor rotates relative thereto or whether the conductor is mounted on the magnetic pole piece and rotates with it. In such cases, an electromotive force is induced in the conductor. Although the reason for this generation of electromotive forces in the conductor is not fully explicable at this time, it is assumed that the lines of magnetic force rotate with the magnetic pole piece and cut across and through the conductor to induce an electromotive force therein even though the conductor rotates with the magnet.

It is an object of this invention to utilize the homopolar principle of inductance of electromotive forces by providing a generator in which the rotor has no moving parts.

It is another object of this invention to provide a direct current generator in which unidirectional magnetic flux is induced in an inductor that rotates as an integral part of a rotor.

Still another object of the invention is to provide a generator that finds its basis in the homopolar or unipolar type construction and in which centrifugal forces are created in cooperation with magnetic flux to enable the production of electromotive forces from a generator that is inexpensive to construct and efficient in operation.

Figure 3:
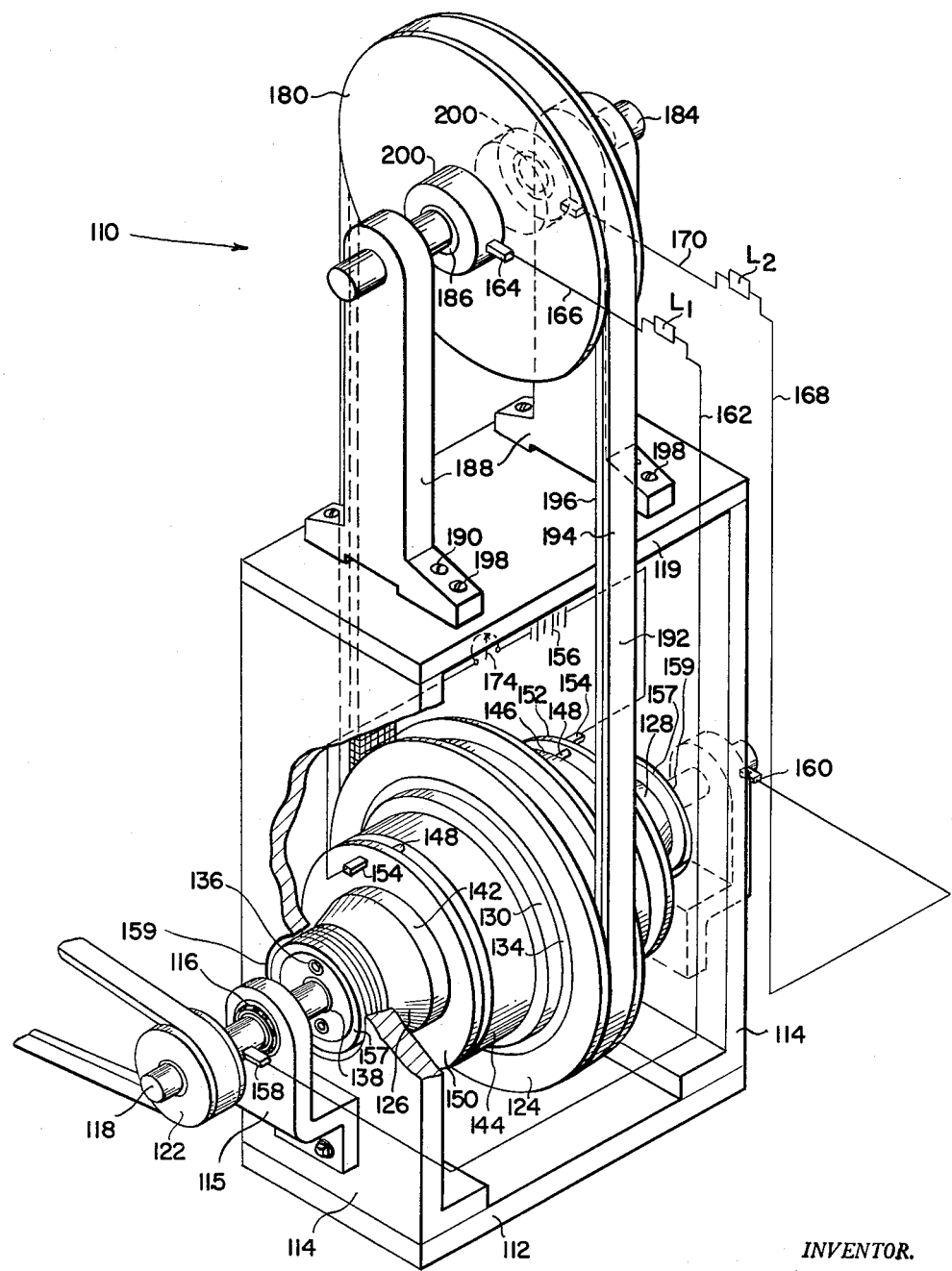
Figure 4:
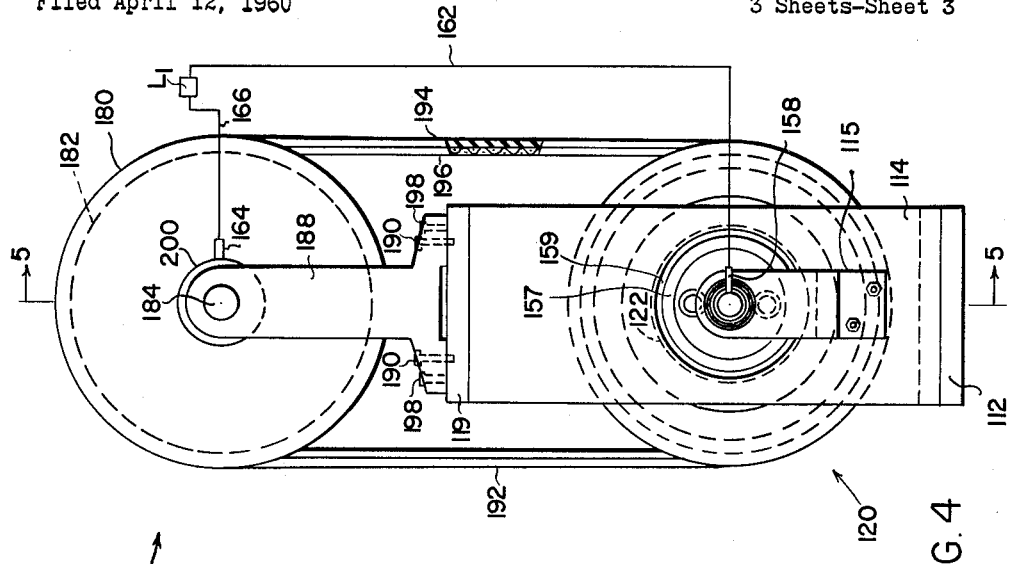
Figure 5:
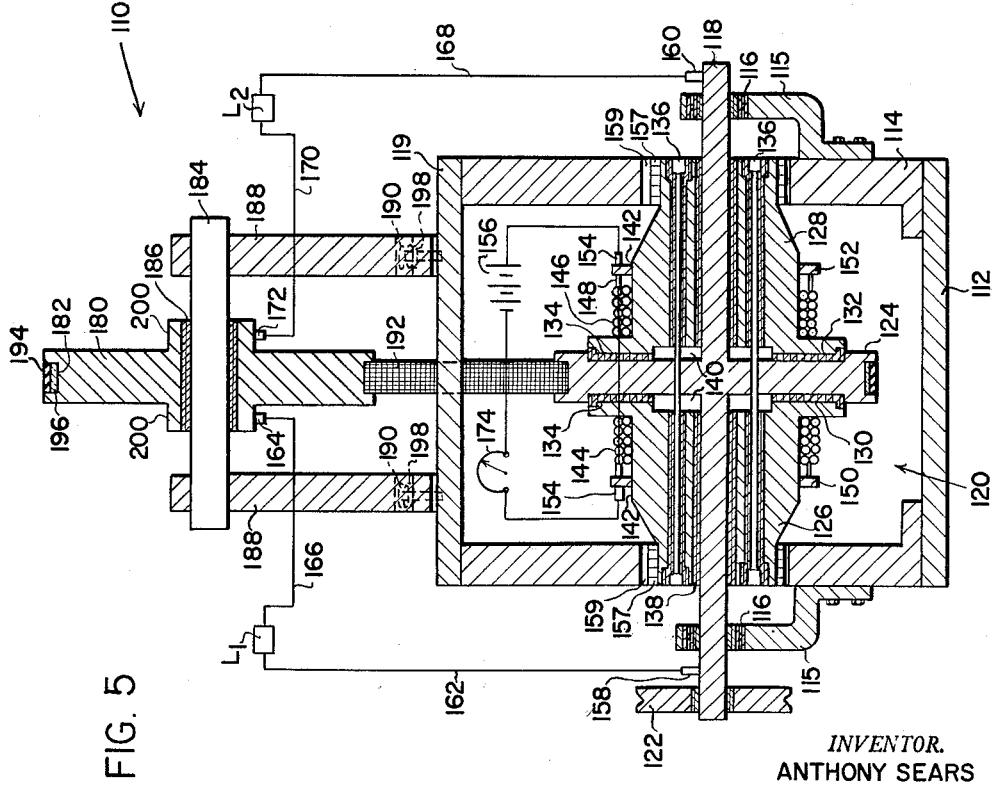

Other and further objects of my invention reside in the structures and arrangements hereinafter more fully described with reference to the accompanying drawings in which:

FIG. 1 is a perspective view of a direct current generator constructed in accordance with the teaching of the invention, FIG. 2 is a vertical cross section of FIG. 1, FIG. 3 is a perspective view of an embodiment of the invention, FIG. 4 is a side elevation of FIG. 3, and FIG. 5 is a cross section view of FIG. 4 taken along lines 5—5.

Referring now to the drawings and more particularly to FIGS. 1 and 2 thereof, there is shown a direct current generator generally identified by the numeral 10. The generator 10 comprises a support that includes a base 12 and vertical and upright support members 14. Each upright support 14 has a bearing 16 to accommodate a respective end of a shaft 18 of a rotor assembly 20. The ends of the shaft 18 are supported in the bearings 16 and insulated therefrom for substantially frictionless rotation.

Connected to one end of the rotor shaft 18 is a driving pulley 22 that is adapted to rotate the rotor 20 from an external power source not shown at any desired speed. The shaft 18 may be constructed of any suitable non-magnetic but electrically conductive material as copper or aluminum. Included in the rotor assembly 20 is an inductor or a non-magnetic electron conductor plate 24 that is disc shaped. The plate member 24 and shaft 18 are angularly joined together to make electrical connection and to form the ends of an electrically conductive circuit or path. Although the drawing shows the plate member 24 joined perpendicularly to the shaft 18, those skilled in the art will recognize that the angle therebetween may be varied. In the drawing, the plate member 18 is formed as a unitary part of the shaft although it may be a separate member and conveniently made integral therewith in any suitable manner.

The rotor assembly 20 also includes a plurality of pole pieces 26 and 28. The pole pieces may be composed of any suitable magnetic or magnetizable material as soft iron, steel or other ferro-magnetic composition. As the description proceeds, it will become more readily obvious to those skilled in the art that the pole pieces 26 and 28 may be magnets or energizible electro-magnets. For the purpose of providing a clearer understanding of this invention, the pole pieces are described and shown as being electro-magnets.

Each pole piece 26 and 28 is provided with an enlarged respective pole face 30 and 32. The pole pieces are positioned along the length of the shaft 18 in spaced relationship from each other and on opposite sides of the disc-shaped electron conductor plate member 24. Each pole face 30 and 32 is positioned adjacent its respective radial surface of the plate member 24 and insulated therefrom by a washer-shaped member 34.

The disc-shaped electron conductor plate member 24 is of slightly greater diameter than the faces 30 and 32 of the adjacent pole pieces 26 and 28. The complete rotor assembly 20 including the pole pieces 26 and 28, the conductor shaft 18 and the electrically connected plate member 24 are secured together by suitable bolts 36 extending from one of the rotor to the other.

The pole pieces 26 and 28 are thoroughly insulated from the plate member 24 by the aforementioned washers 34 while insulator sleeves 38 are positioned between the pole pieces 26 and 28 to insulate the same from the shaft 18. The bolts 36 are similarly insulated throughout their lengths from all of the members through which they extend.

To make the insulation complete between the pole pieces and the conductor shaft and its plate member 24, each pole piece 26 and 28 is provided with a radially extending recess 40. The recesses 40 are so defined within the pole pieces as to be located in the area of the jointure of the shaft 18 with its plate member 24 thereby preventing short circuiting of magnetic flux between the pole pieces and the electrically conductive shaft and plate member when the generator 10 generates electromotive forces.

Thus, the recesses 40 perform a two-fold function. They serve to insulate the pole pieces 26 and 28 from the shaft 18 and the plate member 24. They also serve, however, to concentrate the magnetic flux and magnetic lines of force of the pole pieces and the centrifugal forces closer to the periphery of the disc-shaped conductor plate member 24 in a manner to be described.

Positioned about a lengthwise extending annular shoulder 42 of each pole piece 26 and 28 is an annular energizable coil 44 and 46. The coils 44 and 46 are electrically connected together in series arrangement by a connector 48. The coil structures 44 and 46 each is provided with respective washer shaped electric brush plate 50 and 52 that has brushing electrical engagement with a respective brush element 54. Each brush element 54 is, in turn, connected with an opposite side of a battery 56 or with any other convenient source of direct current.

Secured in brushing engagement with the left and right hand end portions of the electron conductor shaft 18 are electrical brushes 58 and 60 respectively. The brush 58 is joined to one side of a load L1 by a conductor 62. The other side of the load L1 is electrically connected to the circumference of the plate member 24 by an electrical conductor brush 64 and line 66. In a similar manner, a load L2 is connected at its one side to the right hand end portion of the shaft 18 by a line 68 that has electrical connection with the brush 60 while its other side is in electrical circuit engagement with the circumference of the plate member 24 by way of the line 70 and the electrical brush 72.

Referring now to the rotor assembly 20 of the generator 10 shown in FIGS. 1 and 2, it will be noted that rotation of the pulley 22 by any external portion will cause the rotor assembly to turn. In the aforementioned generator 10, wherein the electro-magnetic pole pieces 26 and 28 are employed, the mere rotation of the rotor assembly 20 induces no electromotive force in the disc-shaped electron conductor plate member 24. However, it has been found in practice that if during the rotation of the rotor 20 an electromotive force is applied to the coils 44 and 46 to variably energize the same as by the operation of the line rheostat 74, a series circuit will be completed across the coils from the battery 56. Thus, the coils are energized.

By predetermined series wiring of the coils 44 and 46, the magnetic polarity of the pole pieces 26 and 28 can be predeterminately controlled in direction. Hence, the magnetic lines of force and magnetic flux path may be controlled to move in a desired direction. As a result of the series connection of the coils 44 and 46, the faces 30 and 32 of their respective pole pieces 26 and 28 will have opposing unidirectional magnetic polarity. Accordingly, the magnetic flux path established between the pole pieces will be unidirectional and will extend in the present invention from the face 30 of the pole piece 26 to the face 32 of the pole piece 28, across through the disc-shaped electron conductor plate member 24.

Thus, it is theorized that the magnetic lines of force and the unidirectional magnetic flux path extending between the pole pieces 26 and 28 are interrupted by the inductor member 24 positioned therebetween. Although the phenomenon is not explicable, it is believed that the interruption of the magnetic flux by the electron conductor plate member or inductor 24 induces an electromotive force in such plate member. Hence, by connecting the loads L1 and L2 to the circumference of the electron conductor plate member 64 and 72 respectively and then completing the circuit from the loads L1 and L2 to the shaft 18 at 58 and 60 respectively, there appears to be a movement of electrons from the ends of the shaft 18 inwardly toward the plate member 24 and then outwardly from the plate member 24 to the brushes 64 and 72 and then completing a circuit to their respective loads L1 and L2.

As noted previously, the reason for this apparent movement of electrons is not clear; however, it is known that any rotating member such as the rotor assembly 20, having a magnetic field at the time of rotation, will release electrons. It is believed that because such electrons have mass, they also have weight and, therefore, they respond to centrifugal forces acting on them. Thus, when the rotor assembly 20 is rotated at sufficient speed, the magnetic flux interrupted by the disc-shaped electron conductor plate member 24 induces the release of electrons in such plate member and induces a voltage therein.

It is believed that thereafter the release electrons move to the outer circumference of the rotating conductor 24 where their movement is transferred to the load brushes 64 and 72. Because the plate member 24 is a good electrical conductor, the electrons therein are conditioned to move more freely by the magnetic field extending between the pole pieces 26 and 28 and which it interrupts. Thereafter, the centrifugal force acting upon the moving electrons during the rotation of the complete rotor assembly 20 enables their ready flow from the ends or negative sides of the shaft 18 at the brushes 58 and 60 toward the center or positive circumference of the plate member 24.

As noted previously, and although the reason is not understood, it has been found in use that the generator 10 is capable of inducing a voltage that is controllable in pressure by varying the energization of the coils 44 and 46 and the speed of rotation of the rotor assembly 20. The rheostat 74 enables the control of the degree of energization of the coils and the consequent strength of the magnetic flux path extending between the pole faces 30 and 32 and is believed to hasten or slow the release of electrons in the plate member 24. The speed of rotation of the pulley controls the speed of rotation of the rotor assembly 20 and is believed to control the centrifugal forces acting on the released electrons in the plate member 24.

The embodiment of the generator shown in FIGS. 3, 4 and 5 is generally identified by the numeral 110. Generator 110 is similar in many respects to the generator 10 previously described in that the details of the respective rotor assemblies 120 and 20 operate in substantially the same way. Referring now to FIGS. 3, 4 and 5, there is provided a base 112 having uprights 114 secured in any convenient manner to opposite ends thereof. The uprights 114 have offset shaft bearing supports 115 secured thereto that include shaft bearings 116 to accommodate the ends of an electron conductor shaft 118. As in the previous embodiment 10 the bearings 116 are insulated from the ends of the shaft 118 rotatably mounted therein. Hence, the supports 115 actually serve to support the shaft 118 for rotation.

The uprights 114 extend upward about the ends of the rotor assembly 120 and are connected together at the tops thereof by an enclosing top plate 119. The base 112, the uprights 114 and top plate 119 form an enclosure and as such a complete web that provides a return path for the magnetic flux thereby preventing the same from interfering with or hampering the free rotation of the rotor assembly in a manner to be described.

The rotor assembly 120 is substantially the same as the rotor assembly 20 previously described. Mounted on one end of the shaft 118 is a pulley 122 to turn the shaft and rotor assembly at any desired speed. In the present embodiment, the disc-shaped non-magnetic electron conductive plate member 124 is formed integral with the shaft 118 and at an angle normal thereto. However, the angular disposition of the plate member 124 may be varied with respect to the shaft 118, if desired.

Mounted in axially spaced relationship on the shaft 118 are pole pieces 126 and 128. The pole pieces 126 and 128 may be permanent magnets or variably energizible electro-magnets and, therefore, may be composed of any suitable material as soft iron, steel or ferro-magnetic composition. Each pole pieces 126 and 128 is placed on an opposite side of the electron conductor plate member 124 that is located within the space therebetween. Pole piece 126 is provided with a radially extending pole face 130 while pole piece 128 has a similar opposed pole face 132.

Each pole piece face 130 and 132 is insulated from the plate member 124 by a washer shaped member 134. The pole pieces are secured to the electron conductive plate member 124 and shaft 118 for rotation therewith by suitable tie rods or bolts 136 that extend completely therethrough. As in the prior embodiment 10 insulator sleeves 138 serve to insulate the pole pieces from the shaft 118. Suitable insulating members, not numbered, are placed about the tie rods or bolts 136 to fully insulate the same from the structural elements of the rotor.

In order to complete the insulation of the pole pieces 126 and 128 from the electron conductor shaft 118 and the plate member 124, the same are provided with radially extending recesses 140 that provide an air gap in the area of jointure of the conductive plate member 124 with its shaft 118. Each pole piece 126 and 128 has an annular shoulder 142 on which a respective variable coil 144 and 146 is mounted for rotation therewith. The coils 144 and 146 are electrically connected in series arrangement by a conductor 148.

Each coil 144 and 146 is provided with a brush plate 150 and 152 respectively that is connected by way of an electrical brush 154 to the opposite sides of a battery 156 or any other convenient source of direct current. Interposed in the connection between the battery 156 and the brushes 154 is a rheostat 174 that permits variable electrical energization of the coils 144 and 146 and consequently enables control of the magnetic lines of force and flux that extend between the pole faces 130 and 132 of the electro-magnetic pole pieces 126 and 128 respectively. Those skilled in the art will readily recognize that the direction of movement of magnetic flux may be predeterminately controlled by the manner in which the coils 144 and 146 are connected with the source 156 of direct current.

The rotor assembly 120 of the present embodiment operates in substantially the same manner as the rotor assembly 20 of the previously described generator 10 except, however, in the actual operation of the instant generator 110 it has been found that the enclosure comprising the base 112, the uprights 114 and the top plate 119 would normally function to create eddy currents that would actually dampen or brake the rotation of the rotor assembly 120.

For this reason, the present embodiment includes the provision of rings 157 composed of a plurality of laminations that are mounted on the ends of the pole pieces 126 and 128 for rotation therewith to break-up the eddy current paths. The rings 157 fit within the confines of openings 159 defined in each of the uprights 114. The openings 159 are larger in diameter than that of the rings 157 to accommodate the same and to leave an air gap therebetween. Thus, the web or enclosure 112, 114 and 119 is slightly air gapped from the ring laminations 157 to form a path for the free movement of magnetic flux therethrough. This prevents the formation and accumulation of eddy currents that would normally tend to brake or slow down the rotation of the rotor assembly 120.

In the use of the homopolar generators there is a problem of excessive wear on the electrical brushes because of the great brush friction created at the circumference of the large diameter plate member 124. This great friction speed tends to destroy the brushes very rapidly. Therefore, it is desirable to reduce the brush friction speed to a minimum by reducing the circumference of the electron take-off surface against which the brushes must bear.

In the present embodiment 11, this greater brush wear is reduced by the provision of a disc-shaped electron conductive plate member 180 having a circumferential surface 182 that has substantially the same circumference as that of the electron conductor plate member 124 of the rotor assembly 120. The plate member 180 is mounted for idle rotation about a shaft 184 and insulated from the shaft at 186. The shaft 184 is secured in vertical pedestals 188 that are bolted to the top plate 119 at 190.

A continuous belt 192 extends about the circumference of the electron conductor disc 124 and the idler plate member 180. Belt 192 comprises an insulating backing 194 and an interwoven or intermeshing high conductive facing 196 that serves to electrically link the circumference of the electron conductor plate member 124 with the idler plate member 180 to transmit thereto the voltage induced in the plate member 124.

Each of the upright pedestals 188 is provided with a simple adjustment mechanism in the form of bolts 198 that permit the raising or lowering of the idler plate member 180 relative to the conductive plate member 124 to enable the proper adjustment of tension on the continuous belt 192. The idler electron conductive plate member 180 is provided with axially disposed electron take-off hubs 200 that are of materially less diameter than the circumferential surface 182 or the circumferential surface of the electron conductor plate member 124. Hence, they produce less wear on the electrical take-off brushes that bear against the same as will be presently described. A load L1 is connected between the left hand end of the electron conductor shaft 118 and the electron conductor hub 200 by the brush 158, line 162, line 166 and brush 164. A load L2 may be connected to the right hand end of the shaft 118 by the brush 160 and conductor 168 and to the right hand end of the reduced circumferential conductive hub 200 at the brush 172 and by way of connector 170.

The operation of the instant generator 110 is believed to be substantially the same as the generator 10 previously described. It is known that when the rotor assembly 120 is rotated by the pulley 122, there is no electromotive force induced in the electron conductor plate member 124 when the coils 144 and 146 are not energized and there is no magnetic flux extending between the pole faces 130 and 132. However, if during the rotation of the rotor assembly 120 the rheostat 174 is operated, the coils 144 and 146 become energized and thereby energize their respective pole pieces 126 and 128. This energization creates a unidirectional movement of magnetic flux passing from one pole face to the other through the electron conductor plate member 124.

Because it is known that in homopolar generators the conductor can rotate with the pole pieces, the conductor 124 rotating with the pole pieces 126 and 128, has a voltage induced in it. It is believed that as the rheostat 174 is variably operated to consequently increase the magnetic flux extending between the pole faces 130 and 132, it enables a freer release and consequent movement of electrons in the conductor plate member 124. Hence, if the rheostat 174 is operated to create a greater magnetic flux passing between the pole pieces, there will be a greater freedom of movement of electron induced in the interrupting conductive plate member 124.

Accordingly, it is believed that by variably rotating the rotor assembly 120 at the pulley 122, centrifugal forces can be created that will act upon the freely moving electrons in the plate member 124 to cause them to move to the outer circumference thereof. This movement of electrons at the outer circumference of the plate member 124 is thought to be transmitted by the conductive surface 196 of the belt 192 to the circumference of the idler plate member 180. The electron movement is picked up off the plate member 180 at the integral conductive hubs 200 by the brushes 164 and 172.

Connectors 166 and 170 respectively transmit the electron movements to their respective loads L1 and L2 while the electrical circuits of each such load is completed with the electron conductor shaft 118 by the connector 162 and brush 158 from the load L1 and from the load L2 by the connector 168 and brush 160. Thus, there is a constant flow of electrons through the conductive shaft 118 and the conductive plate member 124. This flow of electrons is believed to be enhanced by the increased energization of the pole pieces 126 and 128 and by the increased speed of rotation of the rotor assembly 120.

While there have been shown and described and pointed out the fundamental novel features of the invention as applied to several preferred embodiments thereof, it will be understood that various omissions and substitutions and changes in the form and details of the devices illustrated and in their operation may be made by those skilled in the art, without departing from the spirit of the invention. It is the intention, therefore, to be limited only

I claim:
1. In an electric current generator, a rotatable electrically conductive shaft, an electrically conductive member having a radially directed body rotatable with said shaft, means to rotate said shaft, pole pieces of opposite polarity on opposite sides of said member secured for rotation synchronously therewith and with said shaft, said pole pieces having pole faces adjacent their respective sides of said member, each of said pole pieces having a magnetic field and flux extending in one direction therebetween and through said member, and means electrically connecting said shaft and member to complete an electrical circuit therebetween.

2. In an electrical current generator, a rotor comprising an electrically conductive shaft and plate having a radially directed body, pole pieces of opposite magnetic polarity on opposite sides of said plate, each of said pole pieces having a magnetic flux extending in a predetermined direction therebetween and through said plate, means to rotate said rotor and pole pieces together synchronously, and means electrically connected with said rotor at different radial distances to complete an electrical circuit therebetween.

3. In an electric current generator, a shaft, a plate having a radially directed portion electrically connected with said shaft, said shaft and plate being of electrically conductive material, means on opposite sides of said plate having opposite magnetic polarity to establish a unidirectional magnetic flux path therebetween and through said plate, means locking said first named means and plate to said shaft for rotation therewith, means to rotate said shaft, and means connected with said shaft and plate at different radial distances to complete a circuit therebetween.

4. An electric current generator comprising a rotatable electrically conductive radially directed plate, means rotatable with and at the same speed and in the same direction as said plate and having a unidirectional magnetic flux path extending through and interrupted by said plate, means to rotate said plate, and means completing an electrical circuit through said plate at different radial distances thereof.

5. An electric current generator comprising a plurality of spaced energizable electro-magnetic members of opposite polarity, electrically conductive means having a radially directed portion between said members, an electrically conductive shaft on which said members and conductive means are mounted for unitary synchronous rotation, means electrically connecting said members in series relationship to energize the same and induce a magnetic flux path in a predetermined direction from one pole of said members to the other through said conductive means, and means electrically connecting said conductive means and shaft to complete an electrical circuit therebetween.

6. A direct current generator comprising a support, a conductive shaft mounted for rotation on said support, means to rotate said shaft, a conductive disc-shaped plate integrally joined with said shaft and disposed at an angle relative to the axis of rotation thereof, ferro-magnetic pole pieces on opposite sides of said plate and each having a face disposed adjacent to a respective side thereof, means insulating said pole pieces from said plate, means securing said pole pieces and plate together for synchronous rotation with said shaft, recesses defined in said pole pieces adjacent the joint of said plate and said shaft, said pole pieces being of opposite magnetic polarity and having a unidirectional magnetic flux path extending therebetween and interrupted by a portion of said plate disposed radially outward of said recesses, and means electrically connecting said plate and shaft to complete an electrical circuit therebetween.

7. A direct current generator comprising a rotor, a support for said rotor, means to rotate said rotor as a unit, said rotor including a conductive shaft, a conductive plate having a radially directed portion and a plurality of pole pieces of opposite polarity on opposite sides of said plate, said shaft and plate being in electrical conductive engagement, said pole pieces having an applied magnetic polarity to induce a unidirectional magnetic flux therebetween interrupted by said plate, and means electrically connecting a portion of said plate radially outward of said shaft.

8. A direct current generator comprising a rotor, a support for said rotor, means to rotate said rotor as a unit, said rotor including spaced oppositely poled pieces of ferro-magnetic material, an electrically conductive plate having a radially directed portion in said space between said pole pieces and an electrically conductive shaft electrically connected with said plate and secured for said unitary rotation therewith and with said pole pieces, energizable coils on said pole pieces, means electrically connecting said coils in series to variably energize the same and induce unidirectional magnetic flux of varying strength from one pole piece to the other through said plate, a magnetic flux web extending about said pole pieces, an idler member including a conductive plate, current collection means connecting the circumference of said plates, and means electrically connecting said idler member and shaft to withdraw current therefrom.

9. A direct current generator as in claim 8, the circumferences of said plates being substantially equal, said idler member having a conductive bearing surface smaller than the circumference of said plates and said electrical connecting means connecting said bearing surface of said idler member with said shaft.

10. A direct current generator as in claim 8, said current collecting means being a continuous belt having an electrically conductive surface engaging the circumferences of said plates and having an insulating backing.

11. In the method of generating direct current, establishing a unidirectional magnetic flux path between a plurality of members of opposite polarity, interrupting said flux path by an electrical conductor while rotating said conductor and members together synchronously, and completing an electrical circuit with said conductor at a plurality of radially spaced distances thereon.

12. In the method of generating direct current, inducing a unidirectional magnetic flux across a space between a plurality of rotating members of opposite polarity, interrupting the path of said magnetic flux in a conductive member locked to and rotating between said plurality of members at the same speed thereof and completing an electrical circuit with said conductive member at a plurality of radially spaced points thereon.

13. In the method of generating a direct current, establishing a rotating unidirectional magnetic flux path of varying strength between pole pieces of opposite polarity, interrupting said flux path by a conductor having a radially disposed portion, rotating said conductor synchronously with said flux path, and completing an electrical circuit between different radially spaced parts of the conductor.

14. In the method of generating direct current, inducing a unidirectional magnetic flux path in a rotor, varying the strength of said flux path, rotating the rotor, interrupting said flux path by a conductor having a radially disposed portion rotating with said rotor locked thereto to rotate at the same speed and in the same direction as the rotating magnetic flux path, concentrating in a peripheral portion of said conductor the magnetic flux path and centrifugal force created by the rotation of said rotor, and completing an electrical circuit between radially separated portions of the conductor.

No references cited.